United States Patent [19]

Mendenhall

[11] Patent Number: 5,568,755
[45] Date of Patent: * Oct. 29, 1996

[54] QUICK CHANGE ACCELERATOR TUBE ASSEMBLY FOR HYDRAULIC FOOD CUTTER

[76] Inventor: George A. Mendenhall, 4252 S. Eagleson Rd., Boise, Id. 83705

[ * ] Notice: The portion of the term of this patent subsequent to Mar. 8, 2014, has been disclaimed.

[21] Appl. No.: 121,600

[22] Filed: Sep. 15, 1993

Related U.S. Application Data

[63] Continuation-in-part of Ser. No. 19,581, Feb. 18, 1993, Pat. No. 5,421,226.

[51] Int. Cl.⁶ .................................................. B26D 1/03
[52] U.S. Cl. ........................... 83/402; 83/98; 83/932; 406/195
[58] Field of Search ........................ 406/191, 195; 285/19, 20, 364, 406, 920; 83/402, 98, 932, 856, 857, 858; 99/516, 537, 538

[56] References Cited

U.S. PATENT DOCUMENTS

| | | | |
|---|---|---|---|
| 2,478,326 | 8/1949 | Scarth | 406/193 |
| 2,733,105 | 1/1956 | Williams | 406/195 X |
| 3,108,625 | 10/1963 | Lamb et al. | 83/402 |
| 3,109,468 | 11/1963 | Lamb et al. | |
| 3,337,273 | 8/1967 | Farnworth | 406/195 |
| 3,361,173 | 1/1968 | Lamb | |
| 4,082,024 | 4/1978 | Hodges et al. | 83/402 |
| 4,202,567 | 5/1980 | Paddington | 285/364 X |
| 4,423,652 | 1/1984 | Winslow | 83/24 |
| 4,463,972 | 8/1984 | Weinhold | 285/364 X |
| 4,554,721 | 11/1985 | Carty et al. | 406/193 X |
| 4,613,160 | 9/1986 | Reneau | 285/920 X |
| 4,614,141 | 9/1986 | Mendenhall et al. | 83/402 |
| 4,623,172 | 11/1986 | Shepheard | 285/364 X |
| 4,807,503 | 2/1989 | Mendenhall | 83/22 |
| 5,042,342 | 8/1991 | Julian | 83/98 |
| 5,179,881 | 1/1993 | Frey et al. | 83/402 X |

FOREIGN PATENT DOCUMENTS

| | | | |
|---|---|---|---|
| 12114 | 11/1955 | Germany | 406/191 |

*Primary Examiner*—Eugenia Jones
*Attorney, Agent, or Firm*—Frank J. Dykas

[57] ABSTRACT

A Quick Change Accelerator Tube Assembly for a Hydraulic Food Cutter is provided with an accelerator tube liner (10) formed of resilient material. Formed integral with liner (10) are inlet flange (14) and outlet flange (16). The lower half of liner (10) is supported in a cradle (70), the upper half is contained within cradle top cover (72). Seal ring (110) together with yoke-shaped lever bar (112) seal tube liner outlet seal (16) against the surface of the cutter blade housing (38). The inlet flange (14) is sealed against sealing flanges (96 and 98) which are held within flange recess (94) form integral in tube support plate (100).

4 Claims, 10 Drawing Sheets

QUICK CHANGE ACCELERATOR TUBE ASSEMBLY FOR HYDRAULIC FOOD CUTTER

CLAIM OF PRIORITY

This application is a continuation in part of my U.S. patent application Ser. No. 08/019,581 entitled Hydraulic Food Cutter With Automatic Blade Changer, originally filed Feb. 18, 1993, now U.S. Pat. No. 5,421,226.

DESCRIPTION

BACKGROUND OF THE INVENTION

1. Technical Field

This invention relates to an accelerator and alignment tube for use in a hydraulic food cutting apparatus and more particularly to a self sealing and quick change accelerator assembly.

2. Background Art

Many food products, particularly vegetables and fruits are processed prior to sale either by canning or freezing. Unless the product involved is of a naturally occurring edible size, for example peas, the product is usually trimmed and sliced, or diced, to edible size prior to preservation processing such as canning or freezing.

The slicing, dicing and other cutting operations have traditionally been accomplished with mechanical cutters. However, relatively recent advances in food product cutting technologies have resulted in the common use of hydraulic cutting apparatus which can be used to cut food products at relatively high speeds. Cutting capacities of 20,000 pounds to 35,000 pounds per hour are not unusual.

Hydraulic food cutters are used to cut a wide variety of food products, including potatoes, beets, zucchini and cucumbers, amongst others. The prior art relevant to the present invention are the food cutting devices themselves, and not the food product being cut. However, to place the present invention in proper context, and for purposes of clear illustration, this specification presents the prior art and the preferred embodiment in the context of a food cutter cutting potatoes. Cutting potatoes has been the most common application of the present machine. However, it should be distinctly understood that these hydraulic food cutters are capable of cutting and are used to cut a wide variety of food products.

In a typical prior art hydraulic cutting apparatus, where potatoes are to be cut, the potatoes are dropped into a tank filled with water and then pumped through conduit into an alignment chute or tube wherein the potatoes are aligned and accelerated to high speed before impinging upon a fixed array of cutter blades where the potato is cut into a plurality of smaller pieces.

The basic configuration of a prior art system is shown, in schematic format, in Prior Art FIG. 1. One of the components of a prior art hydraulic cutting apparatus for use in cutting potatoes is a receiving tank into which peeled or unpeeled potatoes are dropped. A food pump, usually a single impeller centrifugal pump, is provided. It draws its suction from the receiving tank and pumps water and the suspended potatoes from the tank into an accelerating tube which functions as the converging portion of a venturi. The accelerator tube is used to accelerate and align the potatoes immediately prior to impinging upon the stationary knife blades of the cutter blade assembly.

The use of an accelerator tube is required in order to perform two functions, first to accelerate the food product to the velocity required in order for it to pass cleanly through the knife blade assembly, and secondly to align and center the food products prior to their impinging upon the knife blade assembly.

In the case of potatoes the required velocity ranges from 40 feet per second to around 60 feet per second.

Each whole potato impinging upon the knife blade assembly passes through the cutting blade array and is thereby cut into a plurality of food pieces, for example french fry pieces, which pass with the water into the second half of the venturi which is a diverging tube in which the water and the cut food pieces are decelerated back to a slower velocity. The water and cut food pieces are then deposited onto a dewatering conveyer chain. The water passes through the dewatering conveyor chain and is collected and recycled back to the receiving tank. The cut food pieces remain on the conveyor chain and are carried off for further processing.

In the past, significant effort has been directed toward the development of good alignment or acceleration tubes which can properly align and accelerate the whole food product so that each whole food product is properly centered relative to the cutter blade array prior to impinging upon it. An examples of these efforts can be seen in my patent, U.S. Pat. No. 4,614,141 which teaches an alignment tube assembly which is used to accelerate and align whole potatoes immediately prior to impinging upon a cutter head array.

In the prior art the alignment tube is usually a two part assembly consisting of converging conically shaped metal or rigid housing, into which is inserted a more resilient liner, usually formed of reinforced food grade rubber. The larger inlet end of the tapered housing, in the prior art, is hard plumbed in some fashion or other to the discharge line or output of the centrifugal pump. Usually this is a bolted connection between a flange on the discharge line from the pump and a flange formed integral with input end of the housing.

At the other end, the resilient liner usually extends out a few inches from the convergent end of the outer housing. This extended end of the liner is inserted into the inlet hole of the cutter blade housing. In the better prior art designs the outlet of the accelerator tube liner ends immediately in front of the knife blade array. A water seal between the cutter blade housing and the accelerator tube assembly can be made by hard plumbing the accelerator tube housing to the cutter blade housing, but in more recent designs, this is not done because it is too difficult and time consuming to remove the housing for repair and maintenance.

Since the interface region between the accelerator tube assembly and the cutter blade housing is the narrowest part of the venturi, the hydraulic pressure at that point in the system is greatly reduced from that found at the discharge of the pump, usually in the range of two to ten pounds. As a result, instead of hard plumbing the outlet of the accelerator tube assembly to the inlet of the cutter blade housing, a series of packing rings are used. This is done to shorten the time required to disassemble and remove the accelerator tube assembly from the system. Here the problem is that each time the outlet end of the accelerator tube liner is removed from the inlet of the cutter blade housing, the packing rings should be replaced.

There are a number of reasons why accelerator tube assemblies must be periodically disassembled which include: cleaning; replacement of worn out liners; replacement of the liner with a different size liner; and to clean out a plug of uncut food product. The first three reasons are usually handled as scheduled maintenance items, and the time requirements, while significant are not critical. The fourth reason, the unscheduled and unwanted plug up of the system is a real problem since it often results in a complete shut down of a production line. Unfortunately, system plug ups are a fact of life in hydraulic cutting systems.

In the case of potatoes, production rates for hydraulic cutting systems usually run between 20,000 pounds to 35,000 pounds per hour. For potatoes, at 20,000 pounds per hour cutting rate, given an average 10 ounce potato, the number of potatoes passing through the cutter blade assembly is approximately 32,000 potatoes per hour, or approximately 8.8 potatoes per second. If one potato plugs the cutter blade assembly, in 10 seconds there will be 88 potatoes backed up behind the cutter housing in the accelerator tube assembly; in 20 seconds, 176 potatoes. At 35,000 pounds per hour the problem is further aggravated. In practice, if a prior art hydraulic cutting apparatus plugs while unattended, it is not uncommon for the plug to include backed up, smashed potatoes all the way back and into the food pump. A plug such as this can take hours to clean out since it requires substantial disassembly of the machine and its attendant piping. As a result, it is common practice in food processing plants to provide operating personnel to continuously monitor the operation of the hydro-cutting system.

What is needed is an accelerator tube assembly which can be quickly and easily disassembled and reassembled. That is the object of this invention.

DISCLOSURE OF INVENTION

This object is achieved in a first, simple embodiment, by use of an accelerator tube which is frusto conical in shape, and has formed integral with it, at its larger upstream or inlet end, an inlet sealing flange. An outlet sealing flange is also attached and circumvolves the tube liner at a point near the smaller outlet end thus leaving the outlet end capable of insertion into the inlet of the cutter blade assembly. In the simplest embodiment, flange sealing rings are used to seal the inlet flange to a corresponding flange on the pump discharge and the outlet flange to the surface of the cutter blade housing. Support for the tube liner is provided by a cradle which supports and holds the lower half of the liner, and a cradle top cover which contains the upper half of the tube liner in order to prevent swelling under pressure of the tube liner which is formed of a resilient material, usually rubber.

In a second preferred embodiment, the same tube liner with inlet and outlet flanges is used, as is the cradle assembly. However, quick release mechanisms are provided for both the inlet flange and the outlet flange as well as a pair of alignment shoes which are capable of being withdrawn from compressive engagement with the surface of the tube liner adjacent to the cutter blade assembly.

There are provided a pair of opposing alignment shoes which are mechanically interlocked so as to equalize outward displacement between them when a food product passes through the convergent end of the accelerator tube liner and expanding or stretching it. The mechanical interlock utilizes shoe pivot arms pivotally connected to the alignment shoes. Each shoe pivot arm is attached to a vertical pivot shaft which is used to transfer the angular motion imparted by the outward displacement of the pivot shoes to an equalizer shaft which is connected to the other corresponding equalizer shaft by means of a yoke.

In normal operation, tension is applied to keep the pivot shoes in compressive engagement against the convergent end of the accelerator tube liner by means of a dual action air cylinder attached to the pivot yoke. It provides a constant force on the pair of equalizer shafts so as to keep the alignment shoes in compression against the convergent end of the accelerator tube liner.

The function of the dual action air cylinder is reversed to withdraw the alignment shoes from compressive engagement with the accelerator tube liner so as to facilitate removal of the liner.

The outlet seal ring of the accelerator tube liner is held in compressive, sealed engagement with the surface of the cutter blade assembly by means of a seal ring. The seal ring is pressed against the upstream surface of the outlet seal ring of the accelerator tube liner to hold it in sealed compression. The force for holding the seal ring against the outlet seal ring of the tube liner is provided by a yoke-shaped lever bar which pivots about a pair of pivot pins within slots formed within a pair of yoke slide brackets. The pins serve as a pivot or fulcrum point. Compressive force is applied by means of a threaded engagement screw.

The use of elongated slots within the yoke slide brackets provides a means by which the yoke-shaped lever bar can be pivoted away from engagement with a seal ring and then slid down and out of engagement to facilitate removal of the accelerator tube liner.

At the other end of the accelerator tube liner, the inlet end, a tube support plate is provided which has, on its upstream side, formed integral with it, a recessed flange which is sized to receive, in interfitting relationship, flanges formed integral with both the cradle and cradle top cover to form a flanged surface against which the downstream surface of the inlet sealing flange can be compressed against.

A slidable sealing sleeve is provided which interfits within a sealing sleeve flange in the discharge line of the pump. This sealing sleeve is attached to a crossplate and is slidable into compressive engagement with the upstream surface of the tube liner inlet flange to apply compressive force against the inlet flange which is held between the sealing flanges of the cradle and top cover on the downstream surface, and the sealing sleeve on upstream surface of said flange.

Air cylinders are provided and attached to crossplate 92 to provide for automatic application of compressive and disengaging forces to the sealing sleeve.

BEST MODE FOR CARRYING OUT INVENTION

Figure 1:
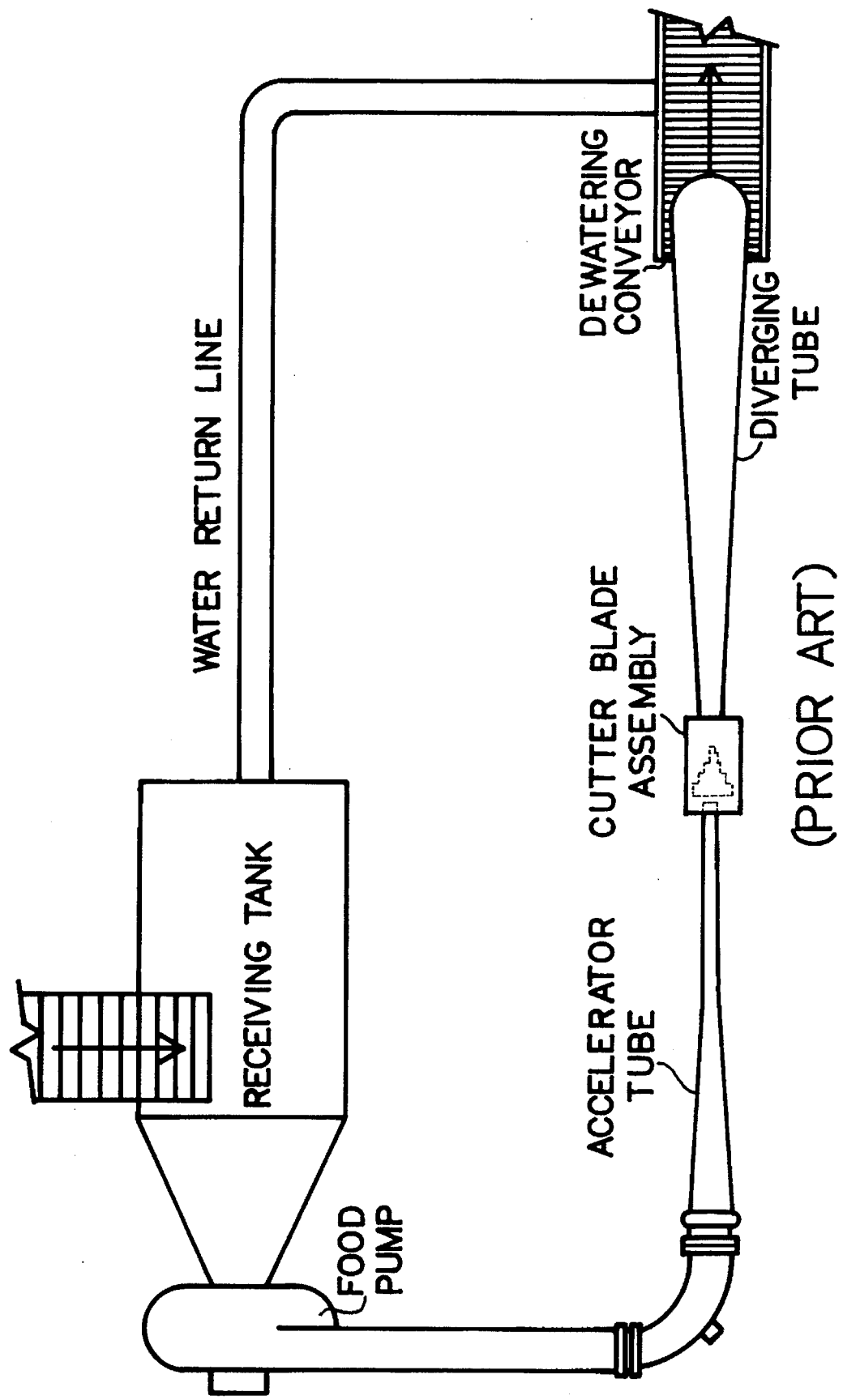
FIG. 1 is a schematic representation of a prior art hydrocutting system.
Figure 2:
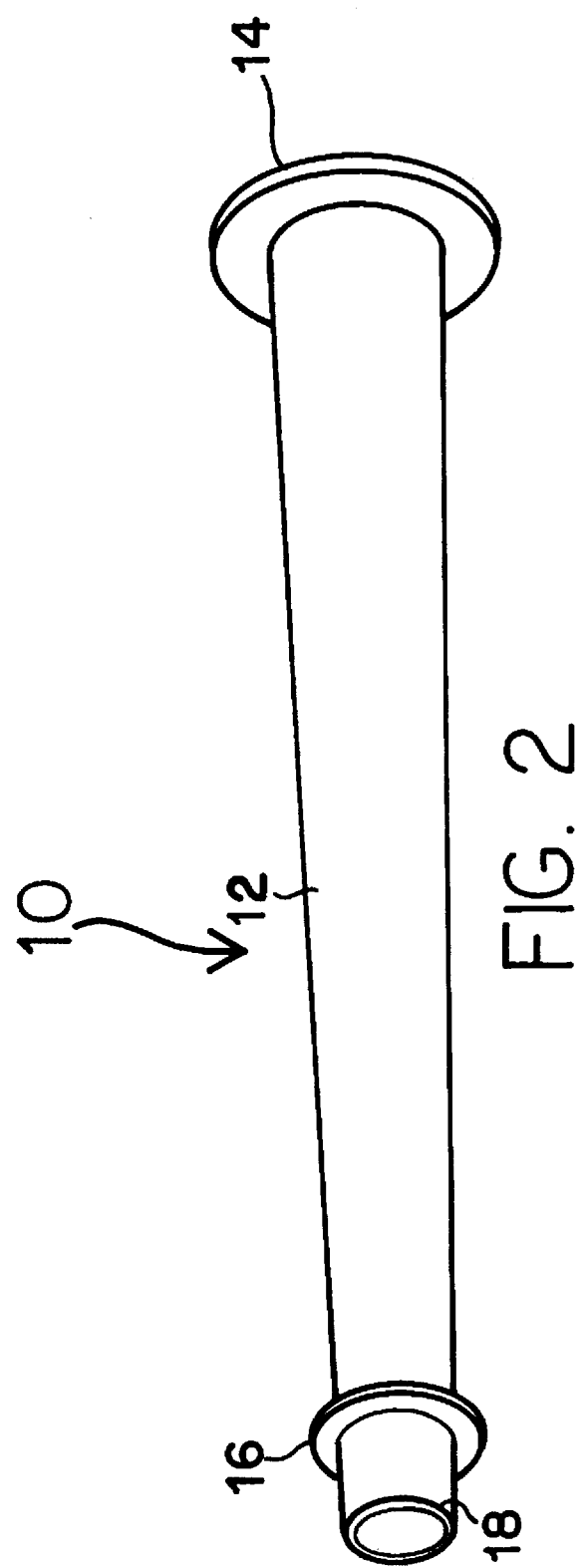
FIG. 2 is a perspective representational view of a new accelerator tube liner.
Figure 3:
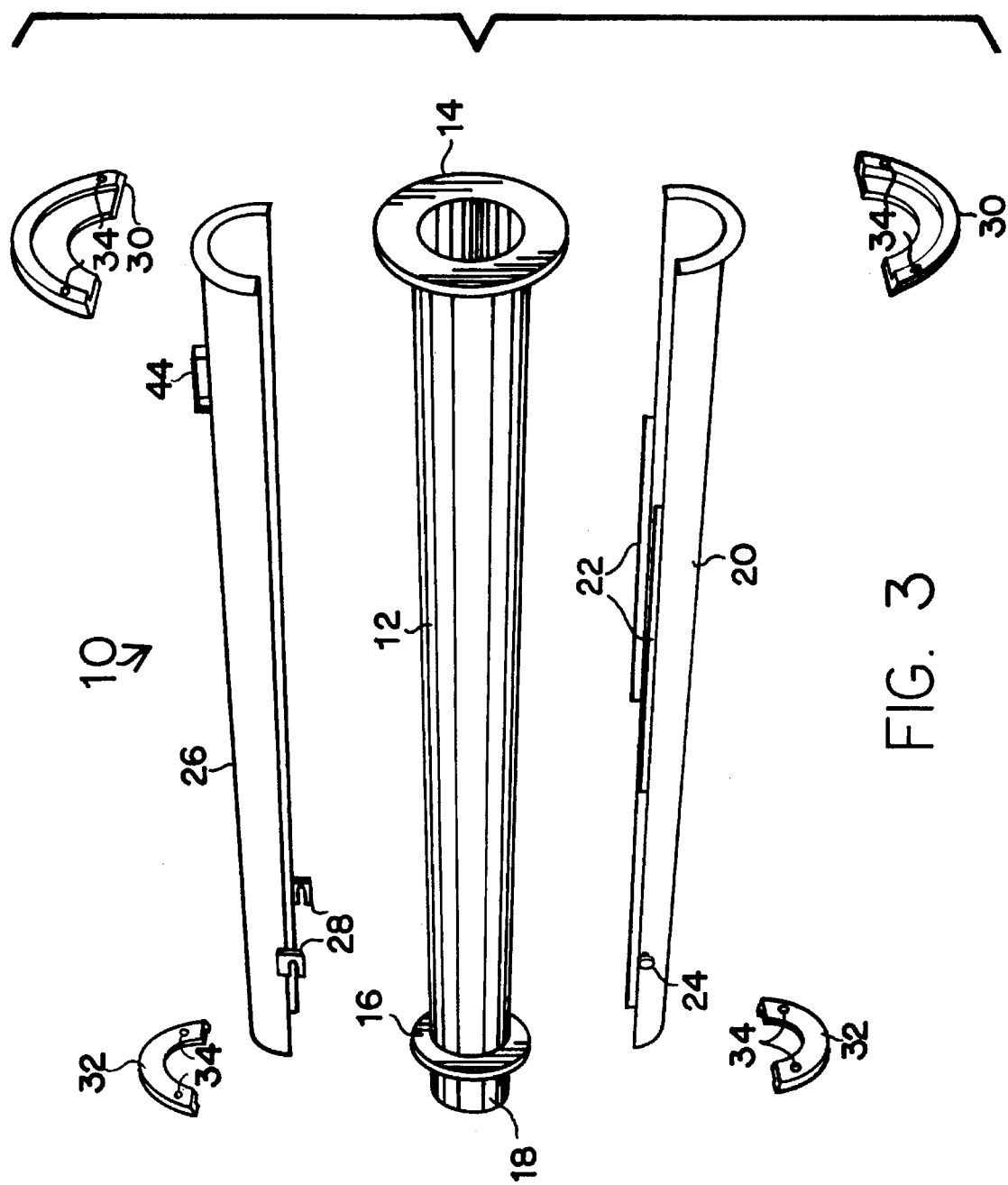
FIG. 3 is an exploded perspective representational view of a first embodiment of an alignment tube assembly.
Figure 4:
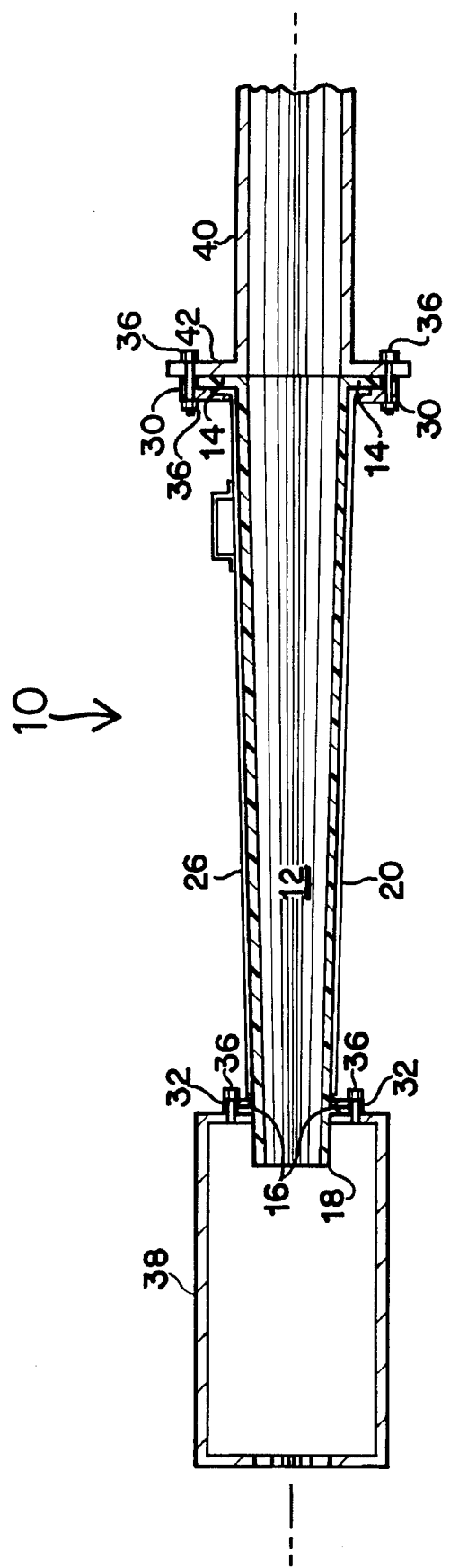
FIG. 4 is a sectional side view of the first embodiment of the accelerator tube assembly.

The present invention is shown, in its simplest embodiment, in FIGS. 2, 3, and 4. As shown in FIG. 2, accelerator tube liner 10 is formed as a single unitary piece of resilient material, usually food grade rubber reinforced with polyester fiber usually of a durometer hardness factor of 70. The primary component is converging conical tube 12, to which is formed integral inlet sealing flange 14. Outlet sealing ring 16 is also attached to and circumvolves cone 12 to define cutter insertion tube portion 18 which, as shown in FIG. 4, is inserted into the inlet of cutter blade housing 38. In the preferred embodiment, the outlet sealing ring 16 is formed of softer rubber than that of conical tube 12, usually of a durometer hardness factor of around 30.

The use of outlet sealing ring 16 as the hydraulic seal between the interface between cutter blade housing 38 and accelerator tube liner 10 results in two significant improvements. First, it eliminates the need for packing rings, and secondly, it has been found in practice that sealing ring 16, when clamped down, aids in keeping tube portion 18 in a centered alignment with the cutter blades held within cutter blade housing 38.

As shown in FIGS. 3, and 4, the lower half of conical tube 12 of accelerator tube liner 10 is supported by means of cradle 20 which is fixed to the framework of the hydrocutting system, not shown in the drawings. Outlet sealing ring 16 rests against the outer wall of cutter blade housing 38, and is sealed against it by means of outlet sealing rings 32 by means of bolts 36 inserted through bolt holes 34. In a like fashion, inlet sealing flange 14 is sealed against pump discharge flange 42 which circumvolves the end of pump discharge pipe 40 by means of inlet sealing flanges 30 by means of bolts 36 passing through bolt holes 34. Cradle top cover 26 is provided to complete the assembly and is held in registration with cradle support 20 by means of alignment tabs 22 and alignment clamps 28 which engage alignment clamp posts 24. Cradle top cover 26 is used to contain, and thereby prevent deformation or swelling under pressure, of tube liner 10.

This first embodiment can be quickly disassembled merely by grasping handle 44 of cradle top cover 26 and pulling it off, and then by unbolting 8 bolts to remove inlet sealing rings 30 and outlet sealing rings 32. Once this had been accomplished, then accelerator tube liner 10 can be lifted out from cradle 20 for replacement, cleaning, or clean out.

Figure 5:
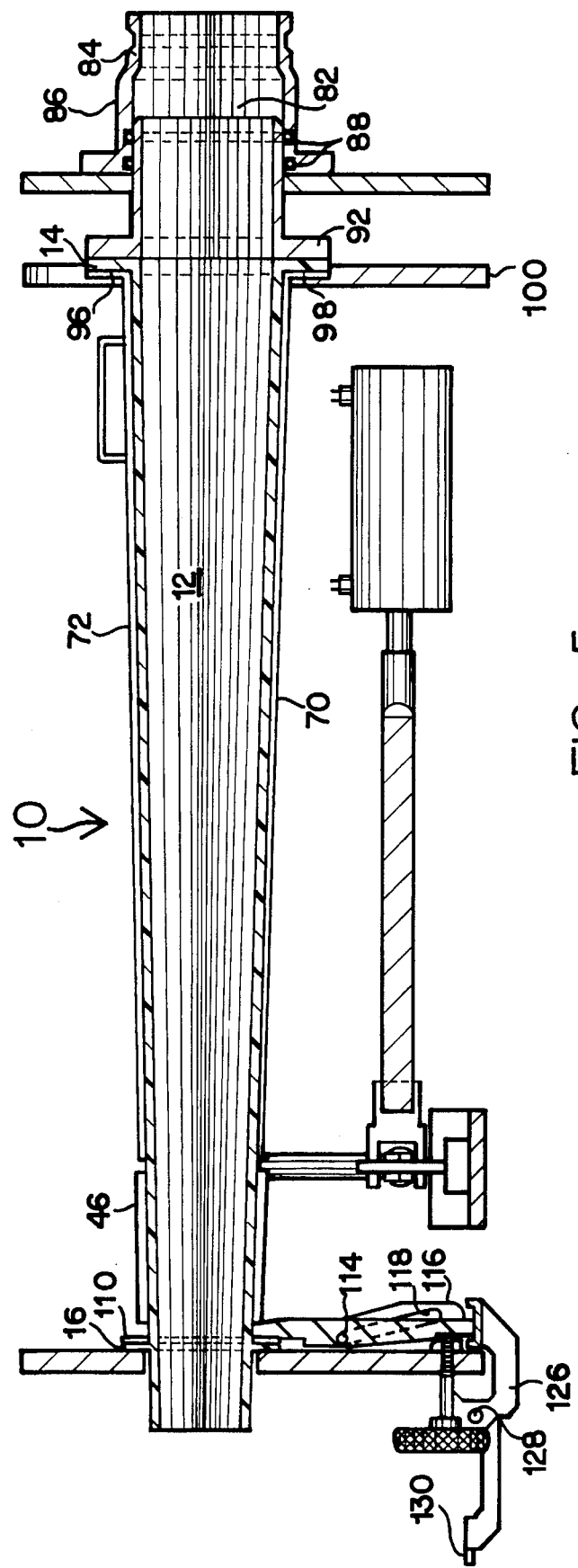
FIG. 5 is a sectional side view of second embodiment of the accelerator tube assembly having alignment shoes.
Figure 6:
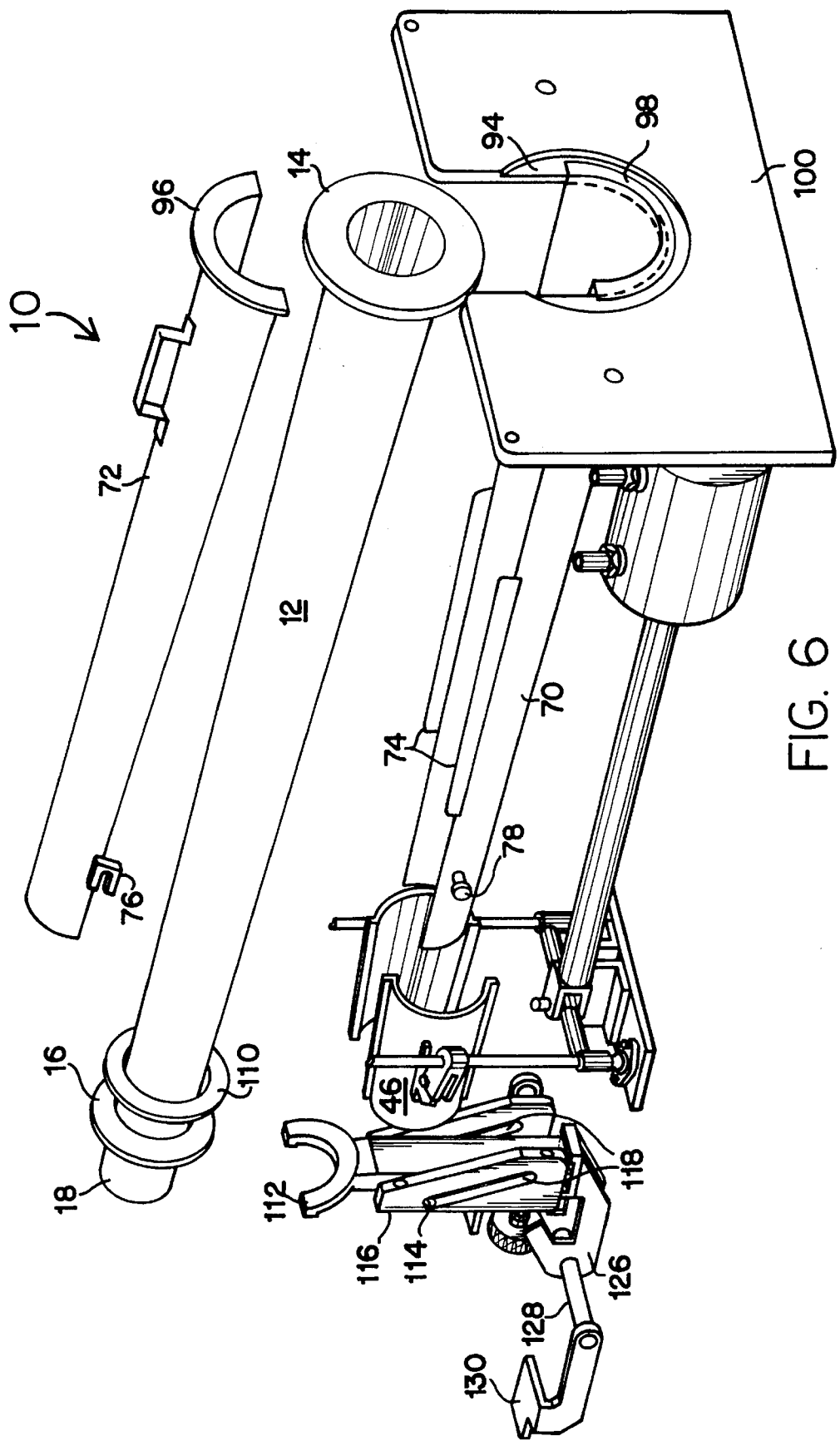
FIG. 6 is an exploded perspective representational view of the second embodiment of the alignment tube assembly.
Figure 7:
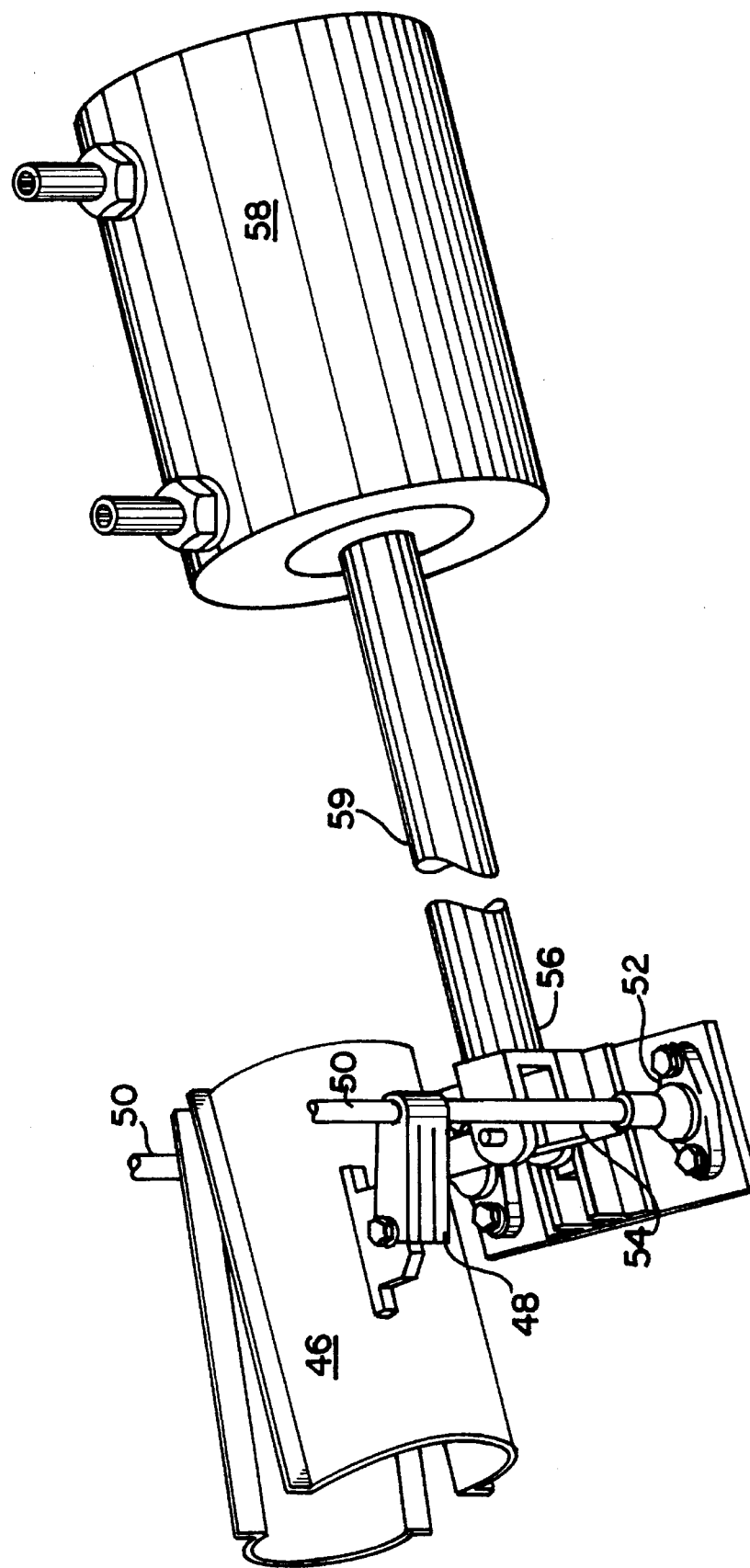
FIG. 7 is a perspective representational view of the second embodiment alignment shoe assembly.

The second embodiment is shown to advantage in FIGS. 5 through 12. In the second embodiment accelerator tube liner 10 is not supported along its entire length by means of cradle 20 as shown in the first embodiment. Instead, as shown in FIGS. 5 and 6, at accelerator tube liner 10's convergent end, the downstream end, the cradle support system is replaced by a pair of opposing alignment shoes 46. These shoes are mechanically interlocked, as shown in FIG. 7, so as to equalize outward displacement of shoes 42 when a food product, such as a potato, passes through the convergent end of accelerator tube liner 10. This serves a function of allowing the use of the smallest possible diameter accelerator tube liner 10, which in turn results in superior centering of the potatoes passing into the cutter blade assembly 38. The mechanical interlock utilizes shoe pivot arms 48 pivotally connected to an alignment shoes 46. Each shoe pivot arm 48 is rigidly attached to a vertical shoe pivot shaft 50 which are vertically oriented and pivotally attached to adjustment shoe base plate 52. A pair of equalizer shafts 54 also extend radially out from pivot shafts 50 for angular rotation when the corresponding alignment shoe 46 is displaced either outward or inwardly. This angular travel of equalizer shaft 54 is transferred through pivotal connector yolk 56 to the other corresponding equalizer shaft. Thus, a displacement of one pivot shoe 46 will result in equal and opposite displacement of the second pivot shoe.

In normal operation, tension to keep pivot shoes 46 in compression against the convergent end of accelerator tube 10 is provided by means of dual action air cylinder 58 being attached to pivot yolk 56. It provides a constant force on the pair of equalizer shafts 54 so as to keep alignment shoes 46 in compression against the convergent end of accelerator tube liner 10 at all times.

This pressure must be relieved in order to release alignment shoes 46 in order to remove and replace accelerator tube liner 10. This is accomplished, in the preferred embodiment by use of dual action air cylinder 58. Dual action air cylinder 58 is capable of not only applying compressive pressure for alignment shoes 46 during normal operation, but also of extending shaft 59 to separate or open alignment shoes 46 away from the convergent end of accelerator tube liner 10.

The sealing of outlet seal ring 16 against cutter blade housing 38 is accomplished by use of seal ring 110 which is slid over the top of the relatively soft and pliable outlet sealing ring 16 and positioned so that it bears against outlet seal ring 16 holding it in compressive water tight seal against the surface of cutter blade assembly housing 38.

Figure 11:
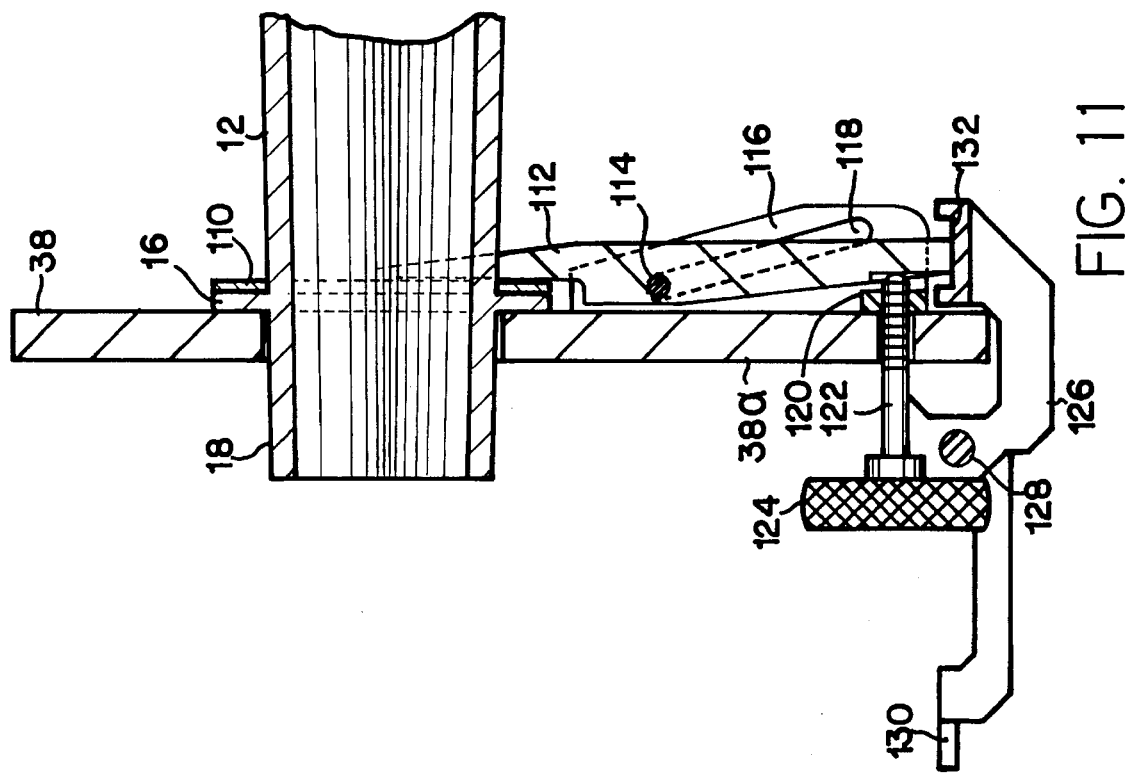
FIG. 11 is a sectional side view of the second embodiment alignment tube outlet sealing assembly in a sealed position.

As shown in FIGS. 5, 6, 11 and 12, compressive force to hold seal ring 110 against outlet sealing ring 16 is provided by means of yoke-shaped lever bar 112 which presses, against seal ring 110. The shaft of yoke-shaped lever bar 112 has formed integral with it two pivot pins 114 which interfit within pivot pin slots 118 formed integral with yoke slide brackets 116. As shown in FIG. 11, in the closed or sealed position, pivot pins 114 are in the fully elevated position within pivot pin slots 118 and serve as a fulcrum point for yoke-shaped lever bar 112. Threaded adjustment screw 122 is provided, and is held in place by means of threaded nut 120 attached to the lower surface 38a of cutter blade housing 38. The adjustment screw 122 is provided with knurled handle 124 and is used to press against the lower portion of yoke-shaped lever 112 in order to provide leverage to push the yoke portion of yoke-shaped lever 112 against seal ring 110.

Figure 12:
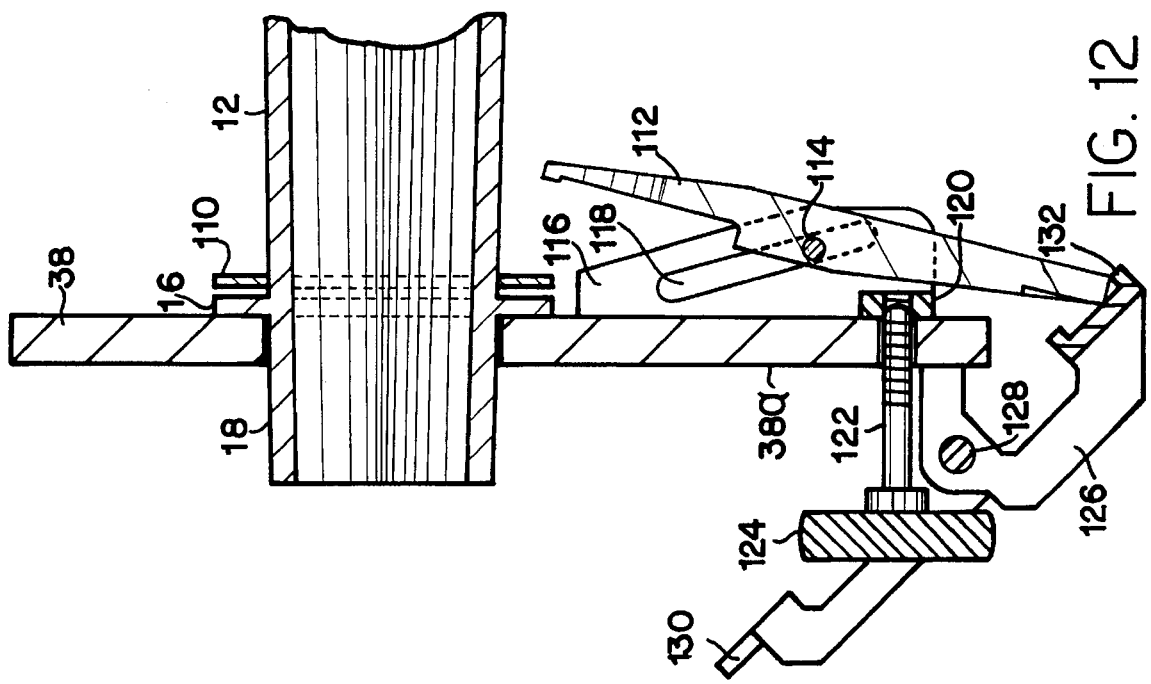
FIG. 12 is a sectional side view of the second embodiment alignment tube outlet sealing assembly in an opened position.

To release the inlet seal ring in order to remove accelerator tube 10, threaded screw 122 is retracted to relieve the levering force against yoke-shaped lever bar 112. Yoke-shaped lever bar 112 can then be pulled away, as is shown in FIG. 12, and slid with pivot pins 114 sliding down through pivot pin slots 118 to drop yoke-shaped lever bar 112 away from engagement with seal ring 110.

To assist in repositioning yoke-shaped lever bar 112, positioning lever 126 is provided. Positioning lever 126 has a bearing surface 132 which engages the bottom end of yoke-shaped lever bar 112. Positioning lever 126 pivots about positioning lever pivot pin 128 and is provided with handle 130. When the accelerator tube liner 10 has been replaced and is ready for use, the operator pushes down on handle 130 to lever up yoke-shape lever bar 112 into position for engagement with seal ring 110. The operator then turns knurled handle 124 to engage threaded screw 122 with the bottom end of yoke-shaped lever bar 112 to apply compressive force to seal ring 110.

Figure 8:
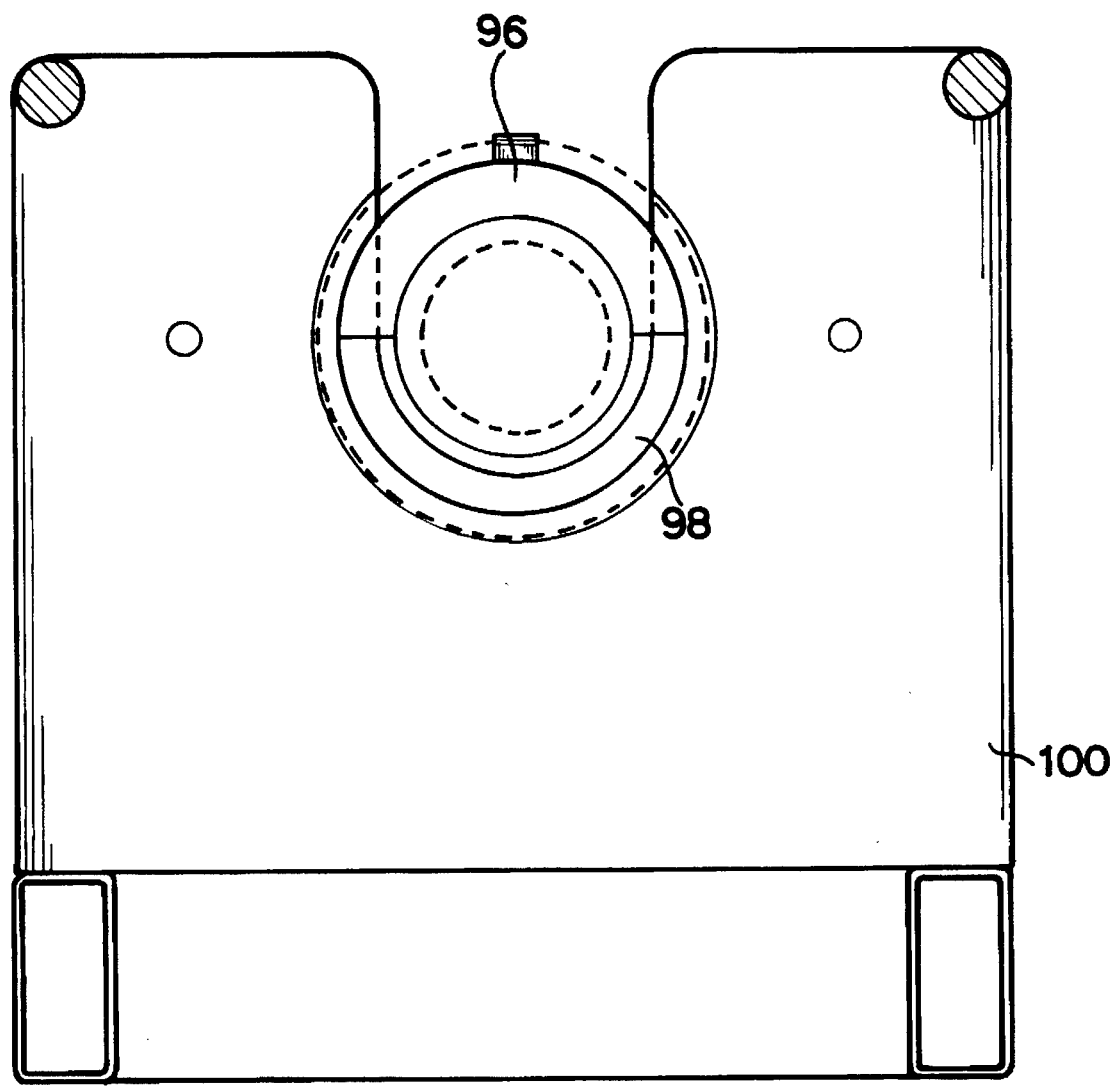
FIG. 8 is a end view of the second embodiment alignment tube support plate.

In a like manner to the simplest embodiment, cradle 70 is provided, along with cradle top cover 72, which is held in registration with cradle 70 by means of alignment tab 74, alignment clamps 76 and alignment clamp posts 78. However, unlike the simplest embodiment, and as shown in FIGS. 6 and 8, cradle 70 and cradle top cover 72 are provided with inlet flanges 96 and 98 which interfit within flange recess 94 which is formed integral within alignment tube support plate 100 to form the downstream sealing surface against which inlet sealing flange 14 is compressed.

Figure 10:
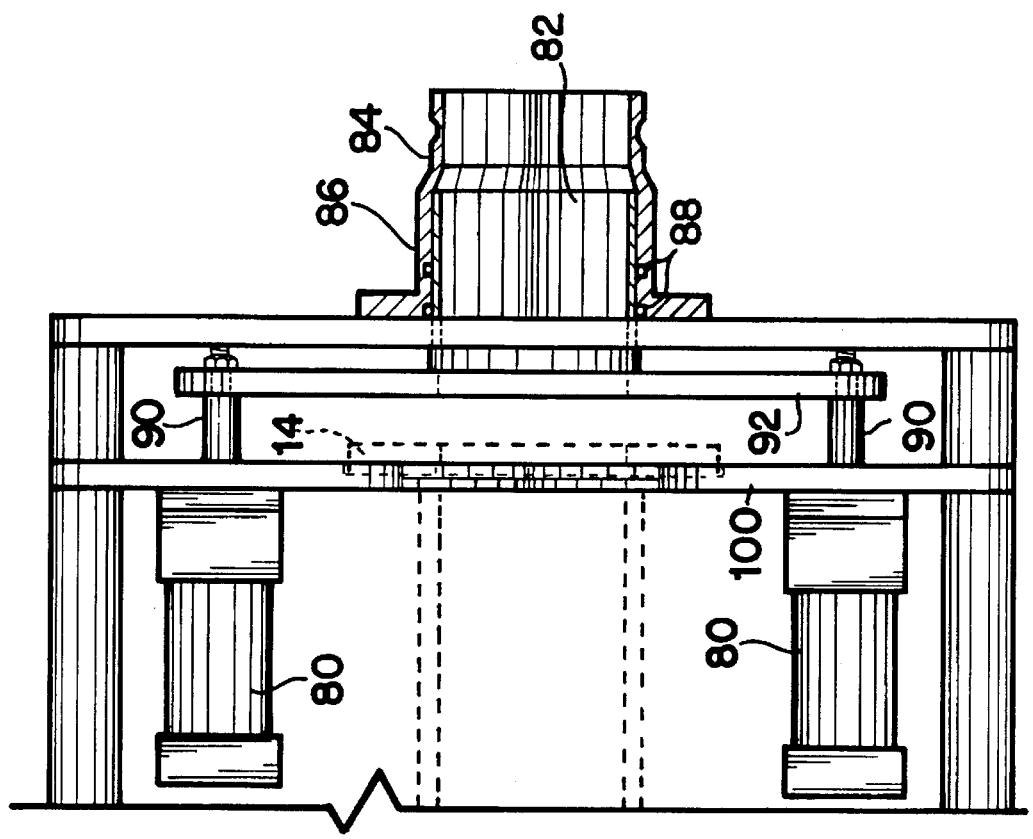
FIG. 10 is a sectional top view of the second embodiment alignment tube inlet sealing sleeve assembly in the unsealed position.
Figure 9:
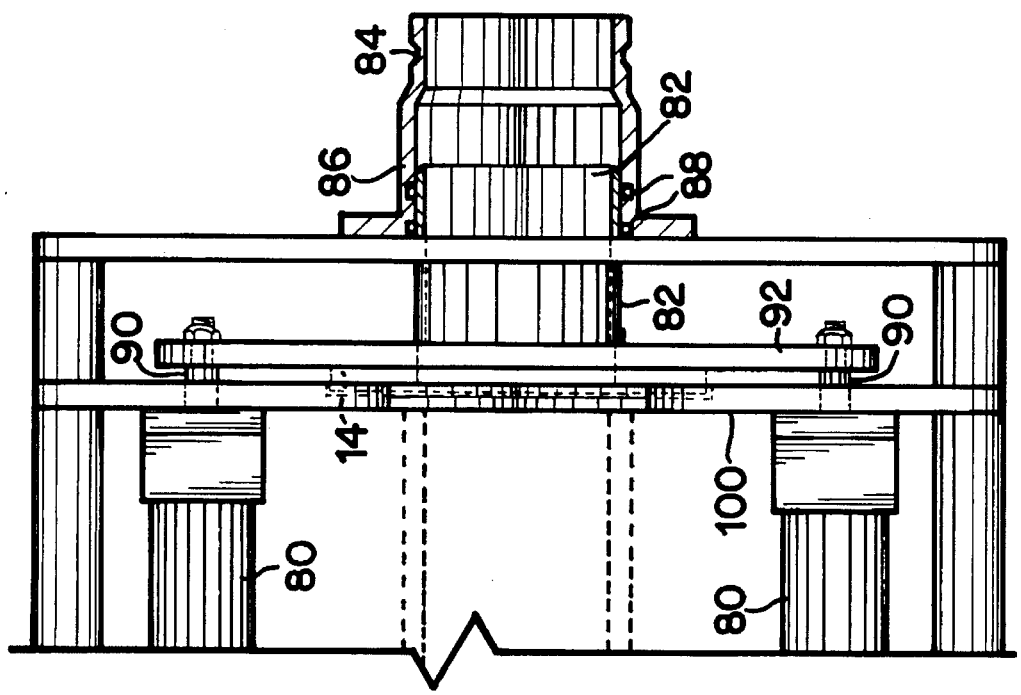
FIG. 9 is a sectional top view of the second embodiment alignment tube inlet sealing sleeve assembly in the sealed position.

As shown in FIGS. 5, 6 and 8 through 10, the upstream surface of inlet sealing flange 14 is sealed against leakage by means of sealing sleeve 82 which is pulled into compressive engagement against the upstream surface of inlet sealing flange 14 by means of a pair of air cylinders 80 interconnected to each other and to sealing sleeve 82 by means of crossplate 92. As can be seen in FIGS. 9 and 10, attached to the end of pump discharge line 84 is sleeve housing 86. Sleeve housing 86 is sized to allow slidable insertion of alignment tube sealing sleeve 82. A water seal between sleeve housing 86 and sealing sleeve 82 is provided by means of a pair of sealing sleeve o-rings 88. Air cylinders 80 are attached to sealing sleeve 82 by means of air cylinder shafts 90. In operation, air cylinders 80 provide positive compressive force for sealing the upstream surface of inlet sealing flange 14 against sealing sleeve 82, and the downstream surface of inlet sealing flange 14 against sealing flanges 96 and 98 of cradle top cover 72 and cradle 70. Since sealing flanges 96 and 98, and inlet flange 14 are held in recess 94, tube liner 10 is locked into recess 94, and thus cannot move or pop out when subjected to hydraulic shock.

To release the upstream end of accelerator tube 10, in order facilitate removal of accelerator tube 10, air cylinders 80 are activated to push alignment tube sealing sleeve 82 away from inlet sealing flange 14 and into sleeve housing 86. Cradle top cover 72 can then be slid back or upstream, to remove cradle plate flange 96 from recess 94, after which cradle top cover 72 can be completely removed from the device.

Concurrently, as previously described, alignment shoes 46 are withdrawn from engagement with the downstream end of accelerator tube 10, and adjustment screw 122 is withdrawn from engagement with yoke-shaped lever bar 112 to facilitate the disengagement and dropdown of yoke-shaped lever bar 112 away from seal ring 110. Once these three steps have been accomplished, accelerator tube 10 can be quickly and easily removed for repair, unplugging or replacement. It should be apparent that reinstallation of another or clean accelerator tube 10 is accomplished simply by the reversal of these written procedures.

While there is shown and described the present preferred embodiment of the invention, it is to be distinctly understood that this invention is not limited thereto but may be variously embodied to practice within the scope of the following claims.

I claim:

1. An accelerator tube assembly for use in a hydraulic food cutting system, said system having a food pump for pumping a pressurized suspension of food products in a fluid into a pump discharge line, a pump discharge line having an outlet, and a cutter blade assembly having an inlet for receiving a pressurized suspension of food products in a fluid, in which the accelerator tube assembly comprises:

a frusto conical shaped tube defining a passageway therethrough for the passage of a pressurized suspension of food products in a fluid from the pump discharge line into the cutter blade assembly, said tube having a larger upstream end and a smaller downstream end for insertion into the inlet of the cutter blade assembly, said tube being formed of a resilient material;

an upstream sealing flange attached to and circumvolving the upstream end of said tube for sealed attachment to the outlet of the pump discharge line, said upstream sealing flange being formed of a resilient material;

a downstream sealing flange, having an upstream surface and a downstream surface, and attached to and normally circumvolving said tube near the downstream end for sealed attachment to the inlet of the cutter blade assembly, said downstream sealing flange being formed of a resilient material;

a circular sealing ring positioned adjacent to the upstream surface of the downstream flange of the tube;

a yoke shaped lever bar having at one end a pair of yoke arms for engagement with diametrically opposing points on the upstream surface of the circular ring, and at the other end, a pressure bearing surface, and between the two ends, a fulcrum pivot pin;

means for rotatably holding the fulcrum pivot pin;

means for selectively applying leverage pressure to the pressure bearing surface to rotate said yoke shaped lever bar into compressive engagement with the upstream surface of the circular ring; and means for sealing the upstream flange to the outlet of the pump discharge line.

2. The accelerator tube assembly of claim No. 1 wherein the means for rotatably holding the fulcrum pivot pin further comprises:

a yoke slide bracket having an elongated hole for rotatably holding said yoke shaped lever arm in compressive, leveraged engagement with the sealing ring when leverage pressure is applied to the pressure bearing surface, and for slidably holding the pivot pin when leverage pressure is not applied.

3. An accelerator tube assembly for use in a hydraulic food cutting system, said system having a food pump for pumping a pressurized suspension of food products in a fluid into a pump discharge line, a pump discharge line having an outlet, and a cutter blade assembly having an inlet for receiving a pressurized suspension of food products in a fluid, in which the accelerator tube assembly comprises:

a frusto conical shaped tube defining a passageway therethrough for the passage of a pressurized suspension of food products in a fluid from the pump discharge line into the cutter blade assembly, said tube having a larger upstream end and a smaller downstream end for insertion into the inlet of the cutter blade assembly, said tube being formed of a resilient material;

an upstream sealing flange attached to and circumvolving the upstream end of said tube for sealed attachment to the outlet of the pump discharge line, said upstream sealing flange being formed of a resilient material;

a downstream sealing flange, having an upstream surface and a downstream surface, and attached to and normally circumvolving said tube near the downstream end for sealed attachment to the inlet of the cutter blade assembly, said downstream sealing flange being formed of a resilient material;

means for applying uniform circumvolving pressure to the upstream surface of the downstream sealing flange for establishing a circumvolving compression seal between the downstream surface of the downstream sealing flange and the cutter blade assembly;

a slidable sealing sleeve for slidable and sealed engagement with the outlet of the pump discharge line;

means for supporting the downstream surface of the upstream flange; and means for releasably holding said slidable sealing sleeve in compressive, sealed engagement with the upstream surface of the upstream flange.

4. An accelerator tube assembly for use in a hydraulic food cutting system, said system having a food pump for pumping a pressurized suspension of food products in a fluid into a pump discharge line, a pump discharge line having an outlet, and a cutter blade assembly having an inlet for receiving a pressurized suspension of food products in a fluid, in which the accelerator tube assembly comprises:

a frusto conical shaped tube defining a passageway therethrough for the passage of a pressurized suspension of food products in a fluid from the pump discharge line into the cutter blade assembly, said tube having a larger upstream end and a smaller downstream end for insertion into the inlet of the cutter blade assembly;

an upstream sealing flange attached to and circumvolving the upstream end of said tube for sealed attachment to the outlet of the pump discharge line;

a downstream sealing flange attached to and normally circumvolving said tube near the downstream end for sealed attachment to the inlet of the cutter blade assembly, said downstream sealing flange being formed of a resilient material;

a circular sealing ring positioned adjacent to the upstream surface of the downstream flange of the tube;

a yoke shaped lever bar having at one end a pair of yoke arms for engagement with diametrically opposing points on the upstream surface of the circular ring, and at the other end, a pressure bearing surface, and between the two ends, a fulcrum pivot pin;

a yoke slide bracket having an elongated hole for receiving and holding said fulcrum pivot pin and for rotatably holding said yoke shaped lever arm in compressive, leveraged engagement with the sealing ring when leverage pressure is applied to the pressure bearing surface, and for slidably holding the pivot pin when leverage pressure is not applied;

means for applying leverage pressure to the pressure bearing surface to rotate said yoke shaped lever bar into compressive engagement with the upstream surface of the circular ring;

a slidable sealing sleeve for slidable and sealed engagement with the outlet of the pump discharge line; and means for supporting the downstream surface of the upstream flange, and means for releasably holding said slidable sealing sleeve in compressive, sealed engagement with the upstream surface of the upstream flange.

\* \* \* \* \*